No. 683,430. Patented Oct. 1, 1901.
B. R. BENJAMIN.
DEVICE FOR SECURING FLAPS OF BELTS FOR GRAIN BINDERS.
(Application filed Jan. 7, 1901.)
(No Model.)
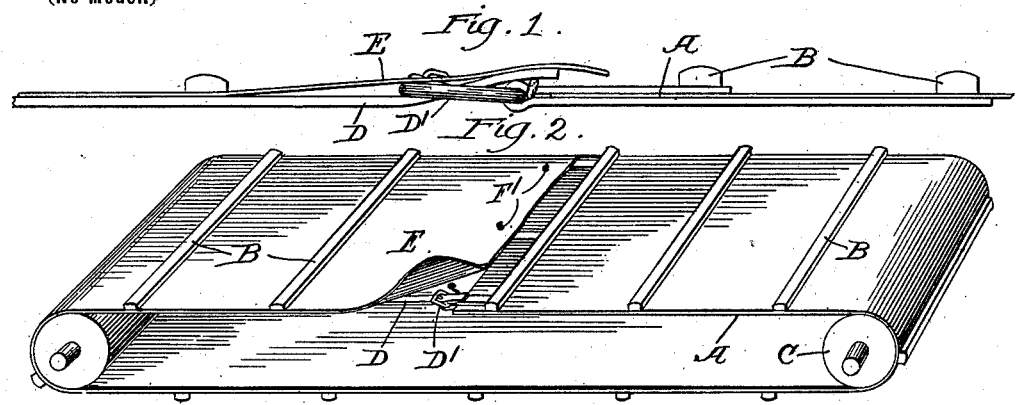
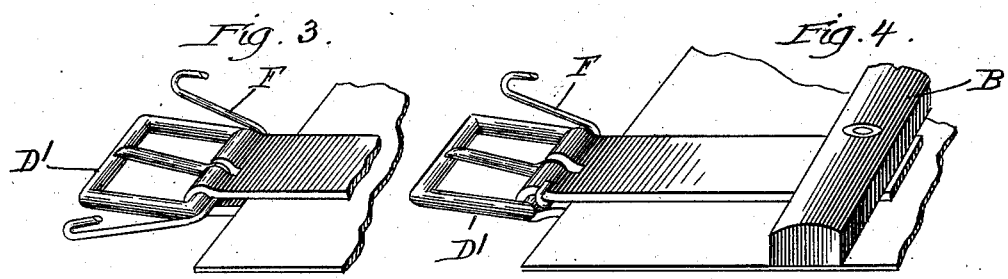
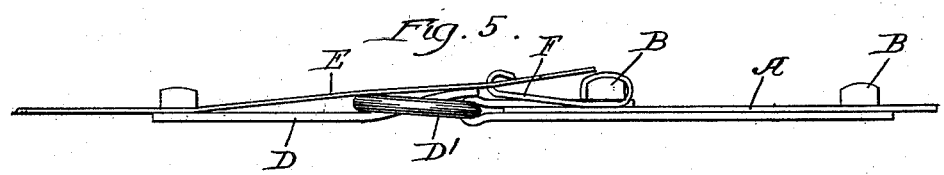
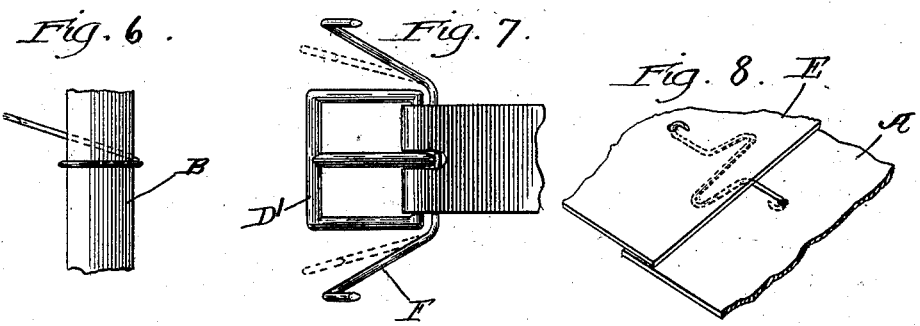
WITNESSES:
INVENTOR
Bert R Benjamin
by Parker & Carter
ATTORNEYS.

UNITED STATES PATENT OFFICE.

BERT R. BENJAMIN, OF CHICAGO, ILLINOIS, ASSIGNOR TO THE McCORMICK HARVESTING MACHINE COMPANY, OF SAME PLACE.

DEVICE FOR SECURING FLAPS OF BELTS FOR GRAIN-BINDERS.

SPECIFICATION forming part of Letters Patent No. 683,430, dated October 1, 1901.

Application filed January 7, 1901. Serial No. 42,287. (No model.)

*To all whom it may concern:*

Be it known that I, BERT R. BENJAMIN, a citizen of the United States, residing at Chicago, in the county of Cook and State of Illinois, have invented a certain new and useful Improvement in Devices for Securing the Flaps of Belts for Grain-Binders, of which the following is a specification.

My invention relates to devices for securing the flaps of belts for grain-binders and the like, and has for its object to provide a new and improved construction for this purpose.

My invention is illustrated in the accompanying drawings, wherein—

Figure 1 is an edge view of a portion of a belt provided with a device embodying my invention. Fig. 2 is a perspective view showing one method of using the device embodying my invention. Fig. 3 is a perspective view showing one form of construction. Fig. 4 is a view showing a modified construction. Fig. 5 is an edge view of a portion of a belt, showing a further modification. Fig. 6 is a plan view showing the holding device illustrated in Fig. 5. Fig. 7 is a plan view of the device illustrated in Fig. 3. Fig. 8 shows a further modification.

Like letters refer to like parts throughout the several figures.

I have shown my invention in connection with a canvas belt of the kind used in grain-binders. Such belts are provided with a loose flap at the point where the ends of the belt are connected together, and great difficulty has heretofore been experienced in securing these flaps in position. This difficulty is due to the expansion and contraction of the parts for various reasons, such as varying degrees of moisture. This expansion and contraction with the devices heretofore used either injured the belt or the securing devices for the flap. One of the objects of my invention is to obviate this difficulty and to provide a securing device which readily adjusts itself to the varying conditions and permits the expansion and contraction without injury to the belt or to the securing device.

I have illustrated in Fig. 2 a canvas belt A of the construction ordinarily used in grain-binders, said belt being provided with the slats B and passing around the rollers C, as shown. The ends of the belt are provided with suitable fastening devices—such, for example, as the straps D and the buckles D'. These fastening devices are covered and protected by the loose flap E. Some suitable means should be provided for securing this flap, and I have illustrated in Fig. 3 one form of device for this purpose. This securing device F consists of an elastic or adjustable device adapted to be fastened to the belt or some part associated therewith and also adapted to be attached to the flap. This securing device adjusts itself to the varying conditions produced by the expansion and contraction of the belt and the straps D, so as to at all times secure the flap without injury to the parts. As illustrated in Fig. 3, this securing device consists of a piece of wire attached to the buckle-support and provided with a suitable engaging device adapted to pass through holes or eyelets F' in the flap. This wire is shown in Fig. 3, with a projecting end on each side of the buckle, each end provided with an engaging part. These ends normally project at an angle, as shown more fully in Fig. 7, and when there is a strain on the parts this angle of inclination varies, thus producing an adjustment which permits the expansion and contraction. When the tension, for example, increases, the two ends of the wire will be pulled toward the buckle, as shown in dotted lines in Fig. 7, thus increasing their length. When the tension decreases, the elasticity of the wire tends to move the parts back to the position shown in full lines, thus shortening the securing device and taking up the slack. When the device shown in Fig. 7 is used, the two ends are moved to the position shown in dotted lines and are then fastened to the flap while in this position. The elasticity of the device tends to spread them out again and permits the proper adjustment. Instead of having the two projecting ends, as shown in Fig. 3, the securing device may be formed as shown in Fig. 4, having only one part which engages the flap. It will be understood that a series of buckles D' and straps D are used, so that several securing devices will be attached to the flap.

As illustrated in Fig. 5, the securing device consists of a wire which instead of being attached to the buckle-support is fastened to one of the slats B of the belt. This wire has an engaging device on the end which passes through a hole or eyelet in the flap, as illustrated, and is inclined, as shown in Fig. 6, so as to produce the desired effect.

In Fig. 8 I have shown a further modification, in which the securing device consists of a wire provided at one end with a hook or fastening device which passes through a hole or eyelet in the flap, the other end being provided with a similar device which passes through a hole or eyelet in the belt. The wire is bent back upon itself, as it were, so as to form a loop, which permits expansion and contraction. The securing device must be of such material or so arranged that it will not be permanently bent or secured by passing around the rollers. When the device is attached near the buckles, the said buckles act in a measure to prevent injurious bending and the elasticity of the material is also utilized for this purpose. In the construction shown in Fig. 8 the loop permits bending when the device passes around the roller, the parts assuming their normal position after the roller has been passed. When leather straps are used to fasten the belt together, as shown, for example, in Fig. 2, the straps themselves stretch when wet, while the canvas contracts. It will thus be seen that these two changes have accumulative effect in putting tension upon the securing devices for the flap.

I have illustrated various forms of this device in order to make its application clear; but it is of course evident that various other constructions may be used. I therefore do not limit myself to the constructions shown.

I claim—

1. The combination with a belt of an elastic securing device attached respectively to the meeting ends of said belt, so as to hold them in proper relation to each other, and adapted to adjust itself to the varying tension due to the expansion and contraction of the parts.

2. The combination with a belt having a loose flap of a securing device for said flap, consisting of an elastic piece attached at one point to the flap and at another point to the belt or some part associated therewith, whereby the belt or parts thereof can expand and contract without interfering with the fastening of the flap.

3. The combination with a belt having a loose flap of a securing device for said flap, consisting of a metallic piece attached at one end to the flap and at the other to the belt and provided with an intermediate part at an angle to the direction in which the belt is traveling, which permits a relative movement of the points of attachment of such securing device.

4. The combination with a belt having a loose flap of a securing device for said flap, consisting of a spring-piece attached at one end to the belt and removably attached at the other end to the flap, said spring-piece adapted to permit relative movement of the parts.

BERT R. BENJAMIN.

Witnesses:
GEORGE C. BLACKMER,
WILLIAM WEBBER.